Figure 1:
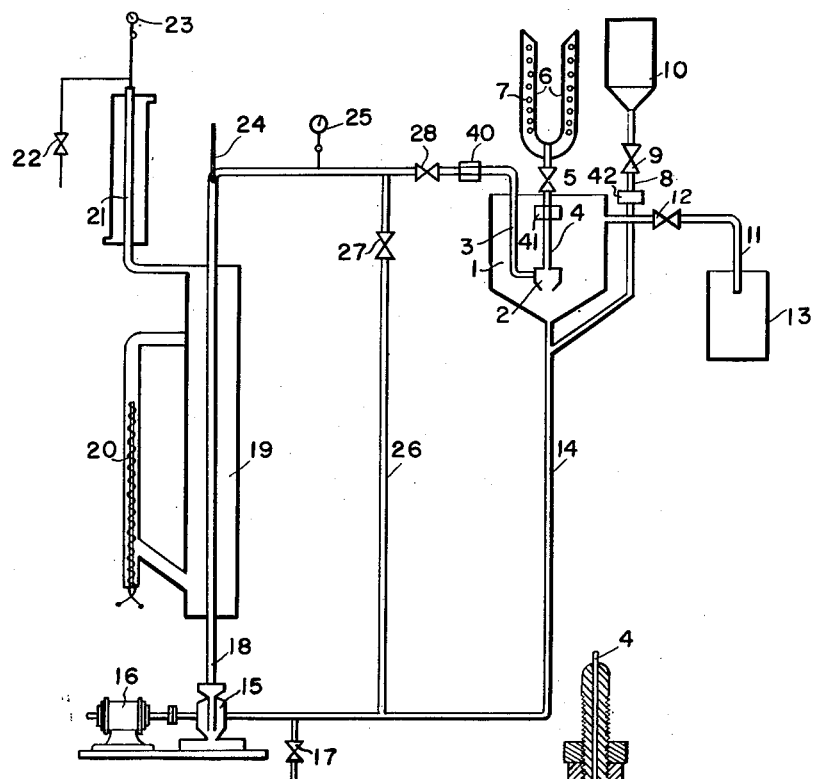

Oct. 30, 1956  D. W. VAN KREVELEN ET AL  2,769,000
PREPARATION OF AMIDES AND LACTAMS
Filed April 1, 1952

INVENTORS
*DIRK WILLEM VAN KREVELEN
ARTHUR LUBERTUS DE GELDER*

BY *Cushman, Darby & Cushman*

ATTORNEYS

United States Patent Office 2,769,000
Patented Oct. 30, 1956

2,769,000

PREPARATION OF AMIDES AND LACTAMS

Dirk W. van Krevelen, Geleen, and Arthur L. de Gelder, Stein, Netherlands, assignors to Maatschappij voor Kolenbeiwerking Stamicarbon N. V., Heerlen, Netherlands Application April 1, 1952, Serial No. 279,884

Claims priority, application Netherlands April 13, 1951

6 Claims. (Cl. 260—239.3)

The present invention relates to a process for carrying out rapid chemical reactions, which, owing to fluctuations in the reaction condition, proceed in an undesirable manner.

With many reactions, especially in the field of organic chemistry, the yield of the reaction or the purity of the reaction products may be adversely affected by temporary or local fluctuations in the reaction conditions, such as fluctuations in the concentration or in the ratio of the concentrations of the reacting components and in the temperature.

This phenomenon occurs, for instance, when one of the reacting components, A, is capable of reacting further with a primarily formed intermediate product, T. If the production of the primary product T is intended only a temporary and local excess of the component A may be sufficient to reduce the purity and even the yield of the product T, provided the secondary reaction proceeds rapidly enough.

Such a temporary and local excess of A occurs even when this component is introduced in a finely divided state into the reacting mixture or into the other reacting components. For, at the surface of a particle A, for instance a drop of liquid, a temporary excess of the component A may be present.

In the same way difficulties may arise when an intermediate product is formed capable of reacting in an undesirable manner with itself or with the final product.

If a reaction is strongly exothermic and one of the reacting components, an intermediate product or the final product is (are) not thermally stable, or if at a high temperature the reaction proceeds in an undesirable manner, the local generation of heat at the surface of a drop of the one component in an excess of the other may sometimes be sufficient to give rise to the formation of undesirable by-products or impurities.

In chemical technology these undesirable side reactions are mostly counteracted by the use of diluting agents or solvents. In case fluctuations in the concentration have a detrimental influence the mixing is often carried out under conditions in which a reaction will not take place, after which these circumstances are altered to such an extent as to enable the reaction to take place. A common method is, for instance, to carry out the mixing at a low temperature, so that the reaction can be started by heating.

In many cases the use of solvents is too expensive both owing to the consumption of the solvent and to the necessary subsequent removal thereof. Diluting with, or dissolving in the ultimate reaction product is only applicable if the final product is sufficiently stable.

Previous mixing of the reacting components under conditions in which the reaction will not take place, for instance mixing at a low temperature and subsequent increase of temperature is in many cases not applicable, either because during alteration of the conditions such as raising the temperature there occurs an intermediate phase, in which a side reaction is started interfering with the main reaction, or because, owing to the strongly exothermic character of the reaction undue increases in the temperature will occur after the reaction has set in.

As a general measure against the occurrence of fluctuations in the reaction conditions stirring, mixing or shaking devices are mostly employed. As far as these devices have moving parts there is often the drawback of high expenses, especially when dealing with corrosive materials or when carrying out reactions with the exclusion of the free atmosphere, for instance at a superatmospheric pressure or in a partial vacuum.

Mixing devices without moving parts, in which mixing is performed under the influence of the flow of the reacting components, often give an insufficient mixing, as is the case with devices having moving parts.

The main object of the invention is to provide an improved process for carrying out these rapid chemical reactions which owing to temporary and local fluctuations in the reaction conditions may be accompanied by undesirable side reactions.

Another object of the invention is to provide an improved process for carrying out rapid exothermic chemical reactions by which temporary and local fluctuations in temperature are prevented.

It is also an object of the invention to provide an improved process for carrying out reactions between components which owing to temporary and local fluctuations of the concentration of one of the components during the mixing process give rise to undesirable side reactions.

A further object of the invention is to provide an improved process for the preparation of substituted carbonamides from oximes by mixing the oxime with a solution of concentrated sulphuric acid or another material by which the conversion is brought about.

A special object of the invention is to provide an improved process for the preparation of cyclic lactams.

Other objects will appear from the description of the invention following hereafter.

In summary these and other objects are attained by our new method by which a detrimental influence on yield and purity caused by fluctuation in the reaction conditions are avoided. This method is to mix the components and to make the reaction proceed under the influence of a strong cyclonic current.

By the expression "a cyclonic current" as used in this specification and the claims hereof is to be understood a rotary current moving spirally inwards towards its axis of rotation so that its angular velocity increases as its radius of rotation decreases. Such a current can be created by forcing a liquid or a gas into a radially symmetrical vessel provided with one or two circular discharge apertures positioned centrally on the axis of symmetry of the vessel, so that a rotating body of liquid or gas comprising a cyclonic current is set up in the chamber. Such a radially symmetrical chamber is hereinafter referred to as a "rotation chamber."

The simplest way of effecting this rotation within the rotation chamber is to introduce the liquid or the gas under pressure into the chamber through one or more tangential feed pipes so that the liquid or gas commences rotation at a radius greater than the radius of the discharge aperture(s). Another solution is the employment of an axial annular feed opening provided with guiding members, for instance guide vanes, which impart a tangential component to the infeeding material so that it commences rotation in the chamber at a radius greater than the radius of the discharge aperture(s).

By the rapid cyclonic current generated in such a manner high shearing stresses may be created in the liquid or the gas, by which a very rapid and a very intensive mixing is attained. If a foreign particle is present in the liquid or gas very great forces are exerted on that particle so that it is rapidly disintegrated or at least the contacting surface area between the particle and the surrounding fluid is very rapidly and completely renewed. Thus the occurrence of fluctuations in the reaction conditions, such as are created in a non-homogeneous or in a not yet homogeneous mixture is largely avoided.

In this way it is possible not only to heighten the purity and increase the yield of the products of a chemical reaction, but also to carry out chemical reactions without using solvents, namely those reactions which up to the present have only allowed of being carried out in dilution on account of their violent character. In some cases it is moreover possible to work at higher temperatures than has hitherto been usual because the heat generated is rapidly distributed over the entire reacting mixture so that local overheating can be avoided.

Rapid mixing in the cyclonic current may, according to the invention, be attained in various ways. It is, for instance possible to supply the various components to a rotation chamber through separate tangential feed pipes. It is also possible to draw one of the components axially into the chamber under the influence of the lower pressure prevailing in the core of the cyclonic current generated within the chamber. The other components or the reacting mixture in which an excess of these components is present are (is) in this case pumped through the chamber so that the cyclonic current is generated in such component(s). In the case of reactions for which small amounts of a catalyst have to be used the reacting components may conveniently be supplied separately through tangentially directed pipes and the catalyst drawn axially into the chamber under the influence of the pressure difference between the core of the cyclonic current and the outside of the chamber.

The pressure under which the reacting components have to be supplied may vary depending on the shape and the dimensions of the apparatus used, the viscosity of the reacting components in question and on the nature of the reaction. Pressures between 1 and 50 atm. gauge pressure have been used in practice.

In general it is thus that, to get the same effect, the pressure has to be raised considerably if the volume of the rotation chamber is increased. Hence it is mostly advantageous to use a number of rotation chambers in parallel in order to provide for an increase in the capacity. If this is done the feed pipes may debouch into a common main feed duct, while also the discharge pipes of the various chambers may debouch into a common discharge chamber.

From the U. S. A. patent specification 1,842,877 it is already known that emulsions of immiscible components and especially asphalt-emulsions can be obtained by forcing these components independently of each other through two tangential feed channels into a rotation chamber with a central discharge. In this connection it has also been remarked (see the U. S. A. patent specification 2,043,108) that this way of mixing may be of importance for carrying out chemical reactions; this has not been proved by arguments or experiments, however.

The invention will be further explained with the help of two examples. For both examples a case was chosen in which very high demands were made upon the method of the invention.

*Example 1*

It is already known that the conversion according to Beckmann of oximes to substituted carbonamides under the influence of sulphuric acid or other material to catalyse the conversion, proceeds very rapidly, while much heat is developed during this process. This reaction, which is of great technical importance for the preparation of the starting materials for the polyamides, especially for the preparation of lactams starting from cyclopentanone-, cyclohexanone- and cycloheptanone-oxime, causes many difficulties in practice, as the large rise in the temperature may cause a decomposition of the lactam formed and of the not yet converted oxime. Some of the impurities formed cannot, or only with much difficulty, be removed from the final product and have a very detrimental effect on the polyamides to be prepared from the lactam. As a result of the presence of these impurities these polyamides are often not colourfast, while moreover the degree of polymerization is strongly influenced.

However, by the process according to the invention a very good product was obtained by making the oxime react with a reacting liquid consisting of a mixture of sulphuric acid and lactam sulphate under the influence of a strong cyclonic current.

The accompanying drawing illustrates a form of apparatus suitable for carrying out the above process according to the invention. In the drawing Fig. 1 shows, diagrammatically an elevation of the apparatus and Fig. 2 shows a detail in section of the rotation chamber in which the reaction was carried out.

The apparatus consists of a vessel 1 in which the rotation chamber 2 is installed. Tangentially to this rotation chamber the feed pipe 3 is provided, the narrower suction pipe 4 being in an axial position. To this suction pipe the vessel 6 is connected, surrounded by a heating jacket 7. The pipe 4 can be operated by a regulating valve 5. The vessel 1 is provided with an overflow pipe 11 in which a valve 12 is provided.

The pipe 8 debouches into the discharge pipe 14 of the vessel 1, this pipe communicating with the tank 10 via a regulating valve 9. The discharge pipe 14 serves at the same time as suction pipe for the pump 15 which is worked by the motor 16. The reacting liquid is forced into the feed pipe 3 of the rotation chamber through the pipe 18, which is provided with a heat exchanger 19 and a regulating valve 28. This pipe has a branch 26 wtih a valve 27 to the suction side of the pump for short-circuiting the pump. If necessary, the apparatus may be emptied by opening the valve 17. The heat exchanger 19 is adapted to supply and remove heat by means of a boiling liquid. To this end a heating spiral is arranged in the branch 20, while a cooler 21 is provided at the upper side. Through the valve 22 compressed gas may be supplied, by which the boiling point of the liquid may be altered. Furthermore, the apparatus is provided with various measuring instruments such as a thermometer 24, pressure gauges 23 and 25 and flowmeters 40, 41 and 42.

Figure 2:
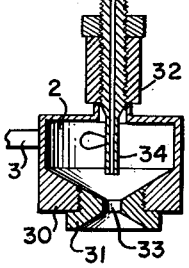

In Figure 2 the rotation chamber for generating the cyclonic current is represented more in detail. This chamber consists of a body 30 in which the rotation chamber 2 has been bored out. Tangentially thereto the feed pipe 3 is provided. The discharge aperture 33 is constituted by a screwed-on nozzle 31. The suction pipe 4 can be adjusted by means of an adjusting screw 32, so that the distance from the end of the suction pipe 34 to the opening 33 can be varied.

In the test we used a rotation chamber of 50 mm. in dia.; the diameter of the feed pipe 3 was 10 mm., the diameter of the pipe 4 was 2 mm. and the diameter of the discharge aperture 33, 10 mm.

In this apparatus a mixture of 1½ parts by weight of sulphuric acid and 1 part by weight of caprolactam is circulated by means of the pump. The temperature is adjusted at 110° C. by means of the heat exchanger. The pressure exerted on the pipe 3 is 2½ atm. gauge pressure, the amount of circulated liquid being 1,000 kg./hour.

The vessel 6 is filled with cyclohexanone oxime which is kept in the molten state by the heating jacket 7. The vessel 10 holds sulphuric acid containing 2% of free $SO_3$.

By partly opening the regulating valves 5 and 9 cyclohexanone oxime and sulphuric acid are fed to the mixture in the ratio of 1:1½ and in an amount corresponding to 10 kg. of oxime per hour.

Under the influence of the strong cyclonic current generated in the rotation chamber the oxime is rapidly dispersed in the reacting mixture, in which manner an extremely rapid and complete conversion is attained. During this process, the total rise in the temperature of the liquid amounts to 15° C. After opening the valve 12 the final product is discharged from the vessel 1 into the collecting vessel 13 via the overflow pipe 11.

The lactam formed may then be recovered in a known manner by neutralizing it with ammonia, separating and distilling once, in which case the yield in lactam amounts to over 98%, calculated on the oxime.

The caprolactam is obtained as a pure white product that is not even discoloured by protracted exposure to daylight. The permanganate number is >500. The polyamide produced from this lactam proves to be perfectly colourless and to remain so, while its degree of polymerization is very high.

In the same way cyclopentanone oxime and cycloheptanone ozime can be converted into the corresponding lactams, the results being equally good.

For a comparison it may here be stated that, in mixing the oxime and the sulphuric acid-lactam-mixture by adding the oxime dropwise to the reacting mixture while stirring very intensively, the resulting lactam was of a far lower quality. The permanganate number for instance remained below 100.

Determination of the permanganate number is made in the following fashion:

3 grams of caprolactam are dissolved in 100 ml. of water and to the solution obtained, there is added one ml. of a 0.01 normal potassium permanganate solution. Subsequently, there is measured the time in seconds, wherein the color of the solution has just changed from violet to yellow, which time in seconds is defined as the permanganate number. The significance thereof is that the impurities consume $KMnO_4$, whereas the caprolactam does not.

It is evident from the above that the greater the permanganate number, the greater the purity of the lactam tested.

Example 2

Through a rotation chamber having an inner diameter of 57 mm., provided with a central discharge aperture with a diameter of 15 mm., a tangentially directed feed conduit with a diameter of 20 mm., and a central suction pipe with a diameter of 4 mm., phenol water was circulated by means of a pump, the pressure drop over the rotation chamber being 2 atm. The phenol water contained 50 grams of phenol per litre. The suction pump was connected to a tank containing bromine water (concentration: 7.5 grams of $Br_2$/litre). No precipitate was formed in the solution, even after an equivalent amount of bromine water had been added.

The obtained liquid was extracted with the help of ether and the extract dried by evaporation.

The extract consisted of monobromophenol, contaminated with small amounts of dibromophenol. The presence of tribromophenol could not be shown.

Adding the bromine water dropwise to phenol water under violent stirring appeared to result invariably in the formation of a precipitate of tribromophenol.

We claim:

1. A process for the preparation of substituted carbonamides from oximes which comprises introducing the oxime axially into a radially symmetrical chamber in which a strong cyclonic current has been generated by forcing tangentially into the chamber a liquid containing a catalyst for the aforementioned conversion, converting said oxime to said carbonamide in the presence of said cyclonic current and discharging the mixture so produced axially from the said chamber through a centrally arranged discharge aperture.

2. A process for the preparation of substituted carbonamides from oximes which comprises continuously pumping a mixture of the substituted carbonamide and concentrated sulphuric acid under pressure tangentially into a radially symmetrical chamber, to thereby produce a strong cyclonic current in said chamber, introducing the oxime axially of said chamber into the low pressure segment of said cyclonic current, converting said oxime to said carbonamide in the presence of said cyclonic current withdrawing a part of the mixture so produced and separating the substituted carbonamde therefrom and recycling the remainder of the mixture, together with make-up sulphuric acid.

3. A process for the preparation of substituted carbonamides from oximes which comprises introducing a mixture consisting essentially of the substituted carbonamide and concentrated sulphuric acid tangentially under pressure into a radially symmetrical chamber, to thereby produce a strong cyclonic current in said chamber having a low pressure core therein, drawing said oxime axially into said chamber under the influence of the lower pressure prevailing in the core of said cyclonic current, converting said oxime to said carbonamide in the presence of said cyclonic current and discharging the mixture so produced axially from said chamber through a centrally arranged discharge aperture.

4. A process as recited in claim 3 in which said oxime is a cyclic oxime and said substituted carbonamide is a lactam.

5. A process for the preparation of a cyclic lactam from an oxime which comprises introducing an oxime selected from the group consisting of cyclopentanone oxime, cyclohexanone oxime and cycloheptanone oxime axially into a radially symmetrical chamber in which a strong cyclonic current has been generated by forcing tangentially into the chamber a liquid mixture of sulfuric acid and the cyclic lactam corresponding to said oxime, converting said oxime to said cyclic lactam in the presence of said cyclonic current, the mixture in said chamber consisting essentially of concentrated sulfuric acid, the cyclic lactam and any unreacted oxime, and discharging the mixture so produced axially from the said chamber through a centrally arranged discharge aperture.

6. A process according to claim 5 in which the cyclic lactam and sulfuric acid are introduced under a super atmospheric pressure of at least one atmosphere gauge, the oxime is drawn into the chamber under the influence of the lower pressure prevailing in the core of said cyclonic current and the mixture in said chamber is composed of the cyclic lactam, concentrated sulfuric acid and any unreacted oxime.

References Cited in the file of this patent

UNITED STATES PATENTS

| Number | Name | Date |
| --- | --- | --- |
| 1,842,877 | Muller | Jan. 26, 1932 |
| 2,043,108 | Maurer | June 2, 1936 |
| 2,249,177 | Schlack | July 15, 1941 |
| 2,297,520 | Wiest et al. | Sept. 29, 1942 |
| 2,351,381 | Wiest | June 13, 1944 |
| 2,487,246 | Johnson et al. | Nov. 8, 1949 |
| 2,557,282 | Hamblet et al. | June 19, 1951 |
| 2,615,906 | Stanton | Oct. 28, 1952 |
| 2,615,907 | Stanton | Oct. 28, 1952 |